United States Patent
Pei et al.

(10) Patent No.: US 10,097,292 B2
(45) Date of Patent: Oct. 9, 2018

(54) METHOD, DEVICE, TERMINAL AND STORAGE MEDIUM FOR ADJUSTING BROADCAST MESSAGE QUEUE

(71) Applicant: GUANGDONG OPPO MOBILE TELECOMMUNICATIONS CORP., LTD., Dongguan, Guangdong (CN)

(72) Inventors: Runsheng Pei, Dongguan (CN); Liangjing Fu, Dongguan (CN); Zhiyong Lin, Dongguan (CN); Ruyu Wu, Dongguan (CN); Jun Zhang, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 15/794,818

(22) Filed: Oct. 26, 2017

(65) Prior Publication Data

US 2018/0262285 A1    Sep. 13, 2018

(30) Foreign Application Priority Data

Mar. 10, 2017    (CN) .......................... 2017 1 0140648

(51) Int. Cl.
 H04H 20/42    (2008.01)
 H04H 20/72    (2008.01)
 H04W 4/60    (2018.01)

(52) U.S. Cl.
 CPC .......... *H04H 20/423* (2013.01); *H04H 20/72* (2013.01); *H04W 4/60* (2018.02)

(58) Field of Classification Search
 CPC ........ H04H 20/72; H04H 20/423; H04W 4/60
 See application file for complete search history.

(56) References Cited

U.S. PATENT DOCUMENTS 5,848,228  A    12/1998  Simatic
 2010/0262651 A1    10/2010  Nguyen
 (Continued)

FOREIGN PATENT DOCUMENTS

CN    103491507 A    1/2014
 CN    103684808 A    3/2014
 (Continued)

OTHER PUBLICATIONS

English Translation of International Search Report in international application No. PCT/CN2017/104801, dated Dec. 29, 2017.
(Continued)

*Primary Examiner* — Raymond Dean
(74) *Attorney, Agent, or Firm* — Ladas & Parry LLP (57) ABSTRACT

Embodiments of the present disclosure disclose a method, device, terminal and storage medium for adjusting a broadcast message queue. The method includes: determining a target broadcast sender of each of a plurality of broadcast messages in a broadcast message queue, the a plurality of broadcast messages being arranged in the broadcast message queue according to broadcast timings of the respective broadcast messages; making statistics on frequency information of identical broadcast messages sent by the target broadcast sender; and when the frequency information of the identical broadcast messages exceeds a predetermined threshold, deleting at least part of the identical broadcast messages in the broadcast message queue so as to adjust the broadcast message queue.

20 Claims, 7 Drawing Sheets

(56) References Cited

U.S. PATENT DOCUMENTS

2015/0026542 A1  1/2015  Brennum
2016/0323170 A1  11/2016 Hu et al.
2017/0265046 A1  9/2017  Chen et al.

FOREIGN PATENT DOCUMENTS

| CN | 105208590 A  | 12/2015 |
| CN | 105357648 A  | 2/2016  |
| CN | 106844069 A  | 6/2017  |
| CN | 106851014 A  | 6/2017  |
| WO | 2016085917 A1 | 6/2016 |

OTHER PUBLICATIONS

English Translation of the Written Opinion of the International Search Authority in international application No. PCT/CN2017/104801, dated Dec. 29, 2017.

Supplementary European Search Report in European application No. 17193565.3, dated Mar. 26, 2018.

METHOD, DEVICE, TERMINAL AND STORAGE MEDIUM FOR ADJUSTING BROADCAST MESSAGE QUEUE

CROSS-REFERENCE TO RELATED APPLICATIONS

This application is filed based upon and claims priority to Chinese Patent Application No. 201710140648.2, entitled "Method, Device and Terminal for Adjusting Broadcast Message Queue", filed on Mar. 10, 2017, the entire contents of which are incorporated herein by reference.

TECHNICAL FIELD

The embodiments of the disclosure relate to a system broadcast technology, and in particular, to a method, device, terminal and storage medium for adjusting a broadcast message queue.

BACKGROUND

An Android system is an operating system, widely applied at present, of a terminal such as a mobile phone. The Android system has many different applications. The Android system implements rapid information transfer across different applications by utilizing a broadcast mechanism. When different applications need to be informed of a message, the message will be sent to different applications by means of a broadcast.

In the Android system, no restriction is imposed on a broadcast message sent by a broadcast sender, so the broadcast sender may send any number of broadcasts at will or may send broadcasts quite frequently. This may result in generating too many broadcast messages to be processed in a broadcast message queue. Thus, the processing speed is low, congestion of the broadcast messages are caused, and normal running of the system is influenced accordingly.

SUMMARY

The embodiments of the disclosure provide a method, device, terminal and storage medium for adjusting a broadcast message queue, capable of avoiding congestion of broadcast messages and reducing influence on system performances caused by broadcasts.

According to a first aspect of the disclosure, the embodiment of the disclosure provides a method for adjusting a broadcast message queue carried out in a terminal. The method includes: determining a target broadcast sender of each of a plurality of broadcast messages in a broadcast message queue, the a plurality of broadcast messages being arranged in the broadcast message queue according to broadcast timings of the respective broadcast messages; making statistics on frequency information of identical broadcast messages sent by the target broadcast sender; and when the frequency information of the identical broadcast messages exceeds a predetermined threshold, deleting at least part of the identical broadcast messages in the broadcast message queue so as to adjust the broadcast message queue.

According to a second aspect of the disclosure, the embodiment of the disclosure also provides a device for adjusting a broadcast message queue. The device includes: a sender determination module, configured to determine a target broadcast sender of each of a plurality of broadcast messages in a broadcast message queue, the a plurality of broadcast messages being arranged in the broadcast message queue according to broadcast timings of the respective broadcast messages; a frequency information statistics module, configured to make statistics on frequency information of identical broadcast messages sent by the target broadcast sender; and a message adjustment module, configured to delete, when the frequency information of the identical broadcast messages exceeds a predetermined threshold, at least part of the identical broadcast messages in the broadcast message queue so as to adjust the broadcast message queue.

According to a third aspect of the disclosure, the embodiment of the disclosure also provides a terminal. The terminal includes a memory, a processor and a computer program that is stored on the memory and can run on the processor. The computer program, when executed by the processor, cause the processor to execute operations including: determining a target broadcast sender of each of a plurality of broadcast messages in a broadcast message queue, the a plurality of broadcast messages being arranged in the broadcast message queue according to broadcast timings of the respective broadcast messages; making statistics on frequency information of identical broadcast messages sent by the target broadcast sender; and when the frequency information of the identical broadcast messages exceeds a predetermined threshold, deleting at least part of the identical broadcast messages in the broadcast message queue so as to adjust the broadcast message queue.

According to a fourth aspect of the disclosure, there is provided a non-transient computer-readable storage medium having stored thereon instructions that, when executed by a processor, cause the processor to execute the method for adjusting a broadcast message queue as described above.

According to the method for adjusting a broadcast message queue provided in the embodiment of the disclosure, statistics are made on frequency information of identical broadcast messages sent by the same broadcast sender, it is judged whether the broadcast messages are sent too frequently, and at least part of the identical broadcast messages is deleted so as to adjust the broadcast message queue. As such, a broadcast congestion and a system congestion caused by high-frequency sending of a broadcast message can be avoided effectively, and influence on system performances caused by broadcasts can be reduced.

A person of ordinary skill in the art will know that though the following detailed description will be made with reference to illustrative embodiments and accompanying drawings, the disclosure is not limited to these embodiments. Instead, the scope of the disclosure is wide, and intended to be defined only by the appended claims.

BRIEF DESCRIPTION OF DRAWINGS

Other features, purposes and advantages of the disclosure will become more apparent by reading the detailed description made on nonrestrictive embodiments with reference to the following drawings.

DETAILED DESCRIPTION

The disclosure will be further illustrated in detail below with reference to the drawings and the embodiments. It will be appreciated that specific embodiments described herein are only used to explain the disclosure and not to limit the disclosure. In addition, it is also to be noted that for convenience of description, only parts relevant to the disclosure, instead of all contents, are illustrated in the drawings.

Before exemplified embodiments are discussed in more detail, it is to be noted that some exemplified embodiments are described as processes or methods illustrated in the flowchart. Although the flowchart describes various steps as a sequence process, many of the steps may be implemented paralleled, concurrently or simultaneously. In addition, the sequence of all steps may be re-arranged. When the operation is completed, the process may be ended, but additional steps not included in the drawings may also be provided. The process may correspond to a method, a function, a regulation, a sub-routine, a sub-program or the like.

The embodiments of the disclosure provide a method, device, terminal and storage medium for adjusting a broadcast message queue, capable of avoiding congestion of broadcast messages and reducing influence on system performances caused by broadcasts.

At least some embodiments of the present disclosure provide a method for adjusting a broadcast message queue carried out in a terminal, including: determining a target broadcast sender of each of a plurality of broadcast messages in a broadcast message queue, the plurality of broadcast messages being arranged in the broadcast message queue according to broadcast timings of the respective broadcast messages; making statistics on frequency information of identical broadcast messages sent by the target broadcast sender; and when the frequency information of the identical broadcast messages exceeds a predetermined threshold, deleting at least part of the identical broadcast messages in the broadcast message queue so as to adjust the broadcast message queue.

According to at least some embodiments, deleting at least part of the identical broadcast messages in the broadcast message queue so as to adjust the broadcast message queue may include: retaining a predetermined number of broadcast messages, that enter the queue late in a queuing order, of the identical broadcast messages in the broadcast message queue, and removing broadcast messages ahead of the predetermined number of broadcast messages.

According to at least some embodiments, the predetermined number may be determined according to the length of the broadcast message queue.

According to at least some embodiments, after deleting at least part of the identical broadcast messages in the broadcast message queue so as to adjust the broadcast message queue, the method may further include: identifying a broadcast receiver of each broadcast message according to a queuing order of the broadcast messages in the adjusted broadcast message queue, and distributing the broadcast message to the broadcast receiver.

According to at least some embodiments, the frequency information may be frequency information within a predetermined time period before the current time.

According to at least some embodiments, determining a target broadcast sender of each of a plurality of broadcast messages in a broadcast message queue may include: determining, according to an identifier or configuration parameter of each broadcast message, a target broadcast sender of the broadcast message.

According to at least some embodiments, the predetermined threshold may be determined according to a response speed of the terminal.

According to at least some embodiments, the method may further include: when establishing each of the plurality of broadcast messages, naming the broadcast message. Here, making statistics on frequency information of identical broadcast messages sent by the target broadcast sender may include: judging, according to names of broadcast messages sent by the target broadcast sender, whether the broadcast messages are identical broadcast messages.

At least some embodiments of the present disclosure provide a device for adjusting a broadcast message queue, including: a sender determination module, configured to determine a target broadcast sender of each of a plurality of broadcast messages in a broadcast message queue, the a plurality of broadcast messages being arranged in the broadcast message queue according to broadcast timings of the respective broadcast messages; a frequency information statistics module, configured to make statistics on frequency information of identical broadcast messages sent by the target broadcast sender; and a message adjustment module, configured to delete, when the frequency information of the identical broadcast messages exceeds a predetermined threshold, at least part of the identical broadcast messages in the broadcast message queue so as to adjust the broadcast message queue.

According to at least some embodiments, the message adjustment module may be specifically configured to: retain a predetermined number of broadcast messages, that enter the queue late in a queuing order, of the identical broadcast messages in the broadcast message queue, and remove broadcast messages ahead of the predetermined number of broadcast messages.

According to at least some embodiments, the predetermined number may be determined according to the length of the broadcast message queue.

According to at least some embodiments, the device may further include: a broadcast receiver identification module, configured to identify, after adjusting the identical broadcast messages in the broadcast message queue, a broadcast receiver of each broadcast message according to a queuing order of the broadcast messages in the adjusted broadcast message queue; and a broadcast message distribution module, configured to distribute the broadcast message to the broadcast receiver.

According to at least some embodiments, the frequency information may be frequency information within a predetermined time period before the current time.

According to at least some embodiments, the sender determination module may be configured to: determine a target broadcast sender of each of the broadcast messages according to an identifier or configuration parameter of the broadcast message.

According to at least some embodiments, the predetermined threshold may be determined according to a response speed of the terminal.

According to at least some embodiments, the device may further include: a naming module configured to, when establishing each of the plurality of broadcast messages, name the broadcast message. Here, the frequency information statistics module is configured to: judge, according to names of broadcast messages sent by the target broadcast sender, whether the broadcast messages are identical broadcast messages.

At least some embodiments of the present disclosure provide a terminal, including a memory, a processor and a computer program that is stored on the memory and can run on the processor, wherein the computer program, when executed by the processor, cause the processor to execute operations including: determining a target broadcast sender of each of a plurality of broadcast messages in a broadcast message queue, the plurality of broadcast messages being arranged in the broadcast message queue according to broadcast timings of the respective broadcast messages; making statistics on frequency information of identical broadcast messages sent by the target broadcast sender; and when the frequency information of the identical broadcast messages exceeds a predetermined threshold, deleting at least part of the identical broadcast messages in the broadcast message queue so as to adjust the broadcast message queue.

According to at least some embodiments, deleting at least part of the identical broadcast messages in the broadcast message queue so as to adjust the broadcast message queue may include: retaining a predetermined number of broadcast messages, that enter the queue late in a queuing order, of the identical broadcast messages in the broadcast message queue, and removing broadcast messages ahead of the predetermined number of broadcast messages.

According to at least some embodiments, the processor may be further configured to execute the computer program so as to determine the predetermined number according to the length of the broadcast message queue.

According to at least some embodiments, the processor may be further configured to execute the computer program so as to identify, after deleting at least part of the identical broadcast messages in the broadcast message queue so as to adjust the broadcast message queue, a broadcast receiver of each broadcast message according to a queuing order of the broadcast messages in the adjusted broadcast message queue, and to distribute the broadcast message to the broadcast receiver.

According to at least some embodiments, the frequency information may be frequency information within a predetermined time period before the current time.

According to at least some embodiments, determining a target broadcast sender of each of a plurality of broadcast messages in a broadcast message queue may include: determining, according to an identifier or configuration parameter of each broadcast message, a target broadcast sender of the broadcast message.

According to at least some embodiments, the processor may be further configured to execute the computer program so as to determine the predetermined threshold according to a response speed of the terminal.

According to at least some embodiments, the processor may be further configured to: name, when establishing each of the plurality of broadcast messages, the broadcast message. Here, making statistics on frequency information of identical broadcast messages sent by the target broadcast sender may include: judging, according to names of broadcast messages sent by the target broadcast sender, whether the broadcast messages are identical broadcast messages.

At least some embodiments of the present disclosure provide a non-transitory computer-readable storage medium having stored thereon instructions that, when executed by a processor, cause the processor to execute the method for adjusting a broadcast message queue as described above.

Figure 1:
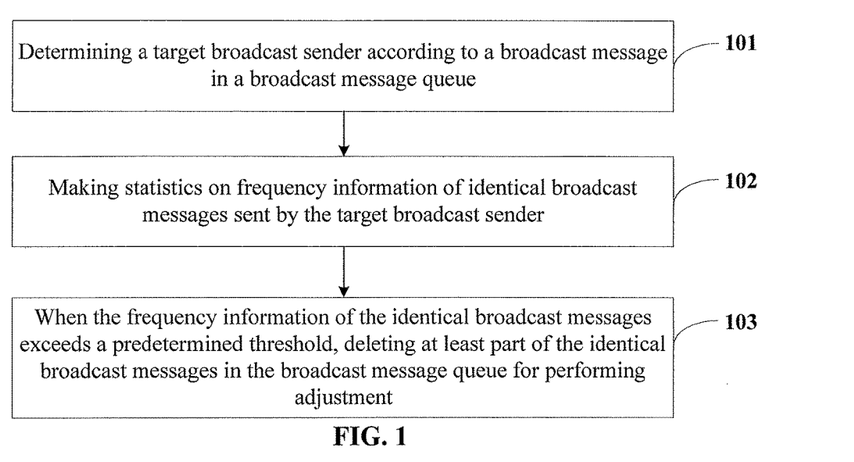
FIG. 1 is a flowchart illustrating a method for adjusting a broadcast message queue according to some embodiments of the disclosure.

FIG. 1 is a flowchart illustrating a method for adjusting a broadcast message queue according to some embodiments of the disclosure. The present embodiment is applicable to a situation of adjusting a broadcast message sending queue. The method may be executed by a device for adjusting a broadcast message queue. The device may be implemented by software and/or hardware. The device may be integrated in a terminal. The terminal may be a smart phone, a tablet personal computer or the like. The method includes the operations in blocks 101-103 illustrated in FIG. 1.

In the block 101, a target broadcast sender is determined according to a broadcast message in a broadcast message queue.

Herein, a broadcast mechanism is substantially a communication manner between assemblies in an operating system of the terminal, and is a mechanism widely applied to message transmission between applications. For example, in an Android system of the terminal, after some operations are completed, a broadcast message will be sent. The broadcast message may be various event message data generated in the operating system. For example, if a short message is sent or a call is made, a broadcast will be sent. When a certain application receives the broadcast, corresponding processing may be performed. The broadcast mechanism includes three essential elements: a broadcaster, a broadcast receiver and an intention content. The broadcaster is used for sending a broadcast, and the broadcast receiver is used for receiving the broadcast. A broadcast receiver may inform the system of a broadcast of interest through a call function. A broadcast receiver may register with the system, thereby having a right of receiving this type of broadcast message. The intention content is used for storing media of broadcast-related information. The broadcast has some similarities with a traditional radio broadcast. The reason why it is referred to as the broadcast is that a sender is only responsible for sending without caring about whether a receiver receives message data and caring about how the receiver processes the message data. In addition, the broadcast may be received by more than one application, and may not be received by any application.

In the Android system, ActivityManagerService is a broadcast center in the broadcast mechanism of the Android system, and is responsible for registration and issuing operations of all broadcasts in the system. Here, broadcast registration refers to a process of registering, by an application, a broadcast receiver with ActivityManagerService. Broadcast issuing includes: a broadcast sender sends a broadcast to ActivityManagerService, and after receiving the broadcast, ActivityManagerService checks an own registration center to determine broadcast receivers which subscribe for the broadcast, and then sends the broadcast to these broadcast receivers one by one.

In the embodiment of the disclosure, the broadcast message queue refers to a form of a queue formed after broadcast messages enter the queue sequentially in an order of broadcast timings. The broadcast message queue may be a default broadcast queue, or may be a third-party application broadcast queue. Exemplarily, the broadcast message queue may be a queue composed of system broadcasts such as a screen-on broadcast, a screen-off broadcast, an unlocking broadcast, a network state change broadcast, a Bluetooth state change broadcast, a language switching broadcast and a theme switching broadcast. Alternatively, the broadcast message may be a queue composed of broadcasts sent by third-party application software. An information source can be determined according to each broadcast message of the broadcast message queue. That is, a target broadcast sender corresponding to each broadcast message is determined. For example, a target broadcast sender can be determined by acquiring a relevant identifier of a broadcast message or relevant configuration parameters.

In the block 102, statistics on frequency information of identical broadcast messages sent by the target broadcast sender are made.

Herein, a broadcast message can be named when the broadcast message is established, and identical broadcast messages may be broadcast messages with identical names. Exemplarily, a plurality of broadcast messages of which the names are 'screen-on broadcast' may be referred to as identical broadcast messages. Within a period of time, the same broadcast sender will probably send a plurality of broadcast messages. Some of these broadcast messages are identical. By making statistics on frequency information of the identical broadcast messages sent by the same target broadcast sender, it can be judged whether the broadcast sender frequently sends the identical broadcast messages. The frequency information may be frequency information within a period of time before the current time or frequency information within a period of time after the current time. In an example of a statistical manner of the frequency information, the frequency information may be calculated by utilizing a ratio of the quantity of the identical broadcast messages sent by the target broadcast sender to a time length. Exemplarily, an application A is taken as a target broadcast sender. It is assumed that frequency messages of screen-on broadcasts within 5 s are counted. If the application A successively sends 30 screen-on broadcasts within 5 s, frequency information may be 6 per second.

Preferably, the frequency information is frequency information within a period of time before the current time.

Herein, when the frequency information is determined by using predetermined time before the current time, broadcast information queuing before the current time can be adjusted in time, so influence on sending of subsequent broadcast messages caused by broadcast congestion can be avoided.

In the block 103, when the frequency information of the identical broadcast messages exceeds a predetermined threshold, at least part of the identical broadcast messages in the broadcast message queue are deleted so as to adjust the broadcast message queue.

Herein, the predetermined threshold may be set according to a response speed of the terminal, and is metric for indicating that the broadcast messages are sent too frequently. The frequency information of the identical broadcast messages, obtained by statistics, may be compared with the predetermined threshold to judge whether the same broadcast sender frequently sends the identical broadcast messages. For example, when the frequency information is greater than the predetermined threshold, it may be determined that the broadcast sender frequently sends the broadcast messages. At least part of the frequently-sent broadcast messages may be deleted so as to adjust the broadcast message queue. This may avoid influence on sending of other broadcast messages due to broadcast congestion caused by too many broadcasts. Broadcasts that are not frequently sent may not be processed.

The method for adjusting a broadcast message queue provided in the embodiment of the disclosure makes statistics on frequency information of identical broadcast messages sent by the same broadcast sender, judges whether the broadcast messages are sent too frequently, and deletes at least part of the identical broadcast messages so as to adjust the broadcast message queue. As such, a broadcast congestion and a system blocking caused by high-frequency sending of broadcast messages can be avoided, and influence on system performances caused by broadcasts can be reduced.

Figure 2:
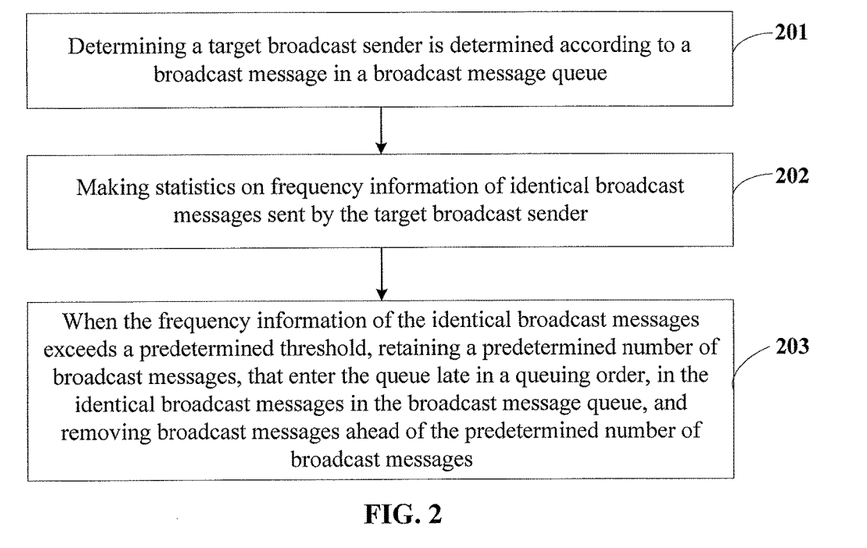
FIG. 2 is a flowchart illustrating a method for adjusting a broadcast message queue according to an embodiment of the disclosure.

FIG. 2 is a flowchart illustrating a method for adjusting a broadcast message queue according to one embodiment of the disclosure. The method in the present embodiment includes operations in blocks 201-203 illustrated in FIG. 2.

In the block 201, a target broadcast sender is determined according to a broadcast message in a broadcast message queue.

In the block 202, statistics on frequency information of identical broadcast messages sent by the target broadcast sender are made.

In the block 203, when the frequency information of the identical broadcast messages exceeds a predetermined threshold, a predetermined number of broadcast messages, that enter the queue late in a queuing order, of the identical broadcast messages are retained in the broadcast message queue, and broadcast messages ahead of the predetermined number of broadcast messages are removed.

Herein, according to the frequency information of the identical broadcast messages, it is judged whether the broadcast messages of the broadcast sender are sent too frequently. For the broadcast messages which are sent too frequently, according to an order in which the broadcast messages enter a queue initially, only a predetermined number of broadcast messages that enter the queue late in a queuing order are retained so as to reduce the frequency of such type of broadcast messages. Exemplarily, the predetermined threshold is set as 2. When frequency information, obtained by statistics, of identical broadcast messages sent by an application A is 4, the frequency exceeds the predetermined threshold. When the predetermined number is set as 3, three broadcast messages, that enter the queue late in a queuing order, in the identical broadcast messages are retained in the broadcast message queue, and all other broadcast messages are removed.

Preferably, the predetermined number is determined according to the length of the broadcast message queue.

Herein, the predetermined number may be a value capable of avoiding the problem of broadcast message congestion. The predetermined number may be determined with reference to the length of the broadcast message queue. Additionally or alternatively, adjustment can be performed on the predetermined number at any time according to the quantity of all broadcast messages queuing in a current broadcast message queue. As such, not only the system blocking can be avoided, but also the quantity of broadcast messages to be sent can be guaranteed to the greatest extent, thereby properly reducing loss of broadcast messages.

According to the method for adjusting a broadcast message queue provided in the embodiment of the disclosure, statistics are made on frequency information of identical broadcast messages sent by a target broadcast sender, and judges whether the broadcast messages are sent too frequently. In addition, in case of sending broadcast messages too frequently, at least part of the identical broadcast messages sent by the target broadcast sender are adjusted according to an adjustment method in which only a predetermined number of broadcast messages, that enter the queue late in a queuing order, in a broadcast message queue are retained. The adjustment method is simple and convenient, and high in operability. In addition, the adjustment method may reduce the quantity of broadcast messages to be sent, thereby effectively avoiding a broadcast congestion and a system blocking caused by high-frequency sending of broadcast messages, and reducing influence on system performances caused by broadcasts. Meanwhile, the adjustment method ensures smooth distribution of the broadcast messages, that enter the queue late in a queuing order. Moreover, the adjustment method may retains the latest broadcast messages of the identical broadcast messages, thereby avoiding loss of the latest broadcast messages.

Figure 3:
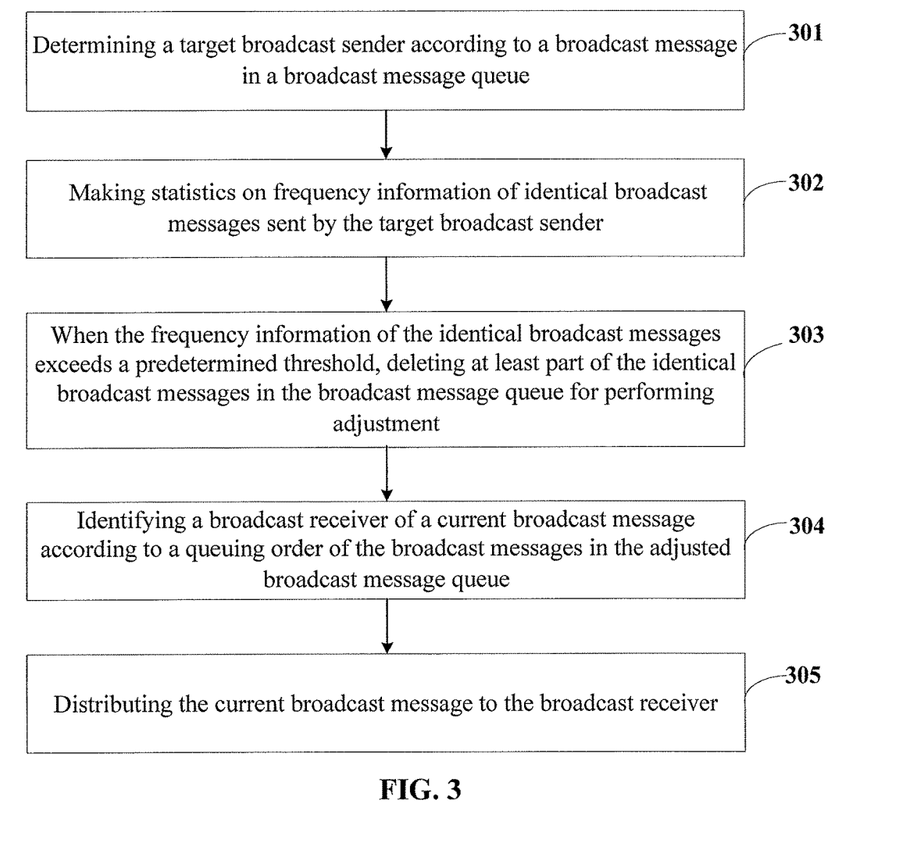
FIG. 3 is a flowchart illustrating a method for adjusting a broadcast message queue according to an embodiment of the disclosure.

FIG. 3 is a flowchart illustrating a method for adjusting a broadcast message queue according to one embodiment of the disclosure. The method in the present embodiment includes operations in blocks 301-305 illustrated in FIG. 3.

In the block 301, a target broadcast sender is determined according to a broadcast message in a broadcast message queue.

In the block 302, statistics on frequency information of identical broadcast messages sent by the target broadcast sender are made.

In the block 303, when the frequency information of the identical broadcast messages exceeds a predetermined threshold, at least part of the identical broadcast messages in the broadcast message queue are deleted so as to adjust the broadcast message queue.

In the block 304, a broadcast receiver of a current broadcast message is identified according to a queuing order of the broadcast messages in the adjusted broadcast message queue.

In the block 305, the current broadcast message is distributed to the broadcast receiver.

Herein, the identical broadcast messages in the broadcast message queue are adjusted to form a new queuing order. Broadcast receivers of the current broadcast message may be identified sequentially with reference to an order of entering the new queue. For example, a broadcast receiver may be determined by looking up a list of receivers that have been registered for the corresponding broadcast message. The broadcast message is distributed to each broadcast receiver sequentially. Exemplarily, the adjusted queue is: broadcast messages A1, A4, B1 and C. The broadcast message to be distributed currently is the broadcast message A1. Applications D, E and F are identified as broadcast receivers. Thus, the broadcast message A1 is distributed to the applications D, E and F respectively. In this way, a distribution process of the broadcast message A1 is completed, and then the broadcast message A4 is distributed.

According to the method for adjusting a broadcast message queue provided in the embodiment of the disclosure, statistics are made on frequency information of identical broadcast messages sent by the same broadcast sender, it is judged whether the broadcast messages are sent too frequently, and adjustment is performed on the identical broadcast messages. In this way, a broadcast congestion and a system blocking caused by high-frequency sending of a broadcast message can be avoided effectively, and influence on system performances caused by broadcasts can be reduced. After a broadcast receiver of a broadcast message to be distributed currently is identified, the broadcast messages in the adjusted broadcast message queue are distributed sequentially according to a queuing order. As such, ordered distribution of the broadcast message can be assured. Timely response of the broadcast receiver to the broadcast message can be ensured, and the phenomenon of no response to an important broadcast message can be avoided.

Figure 4:
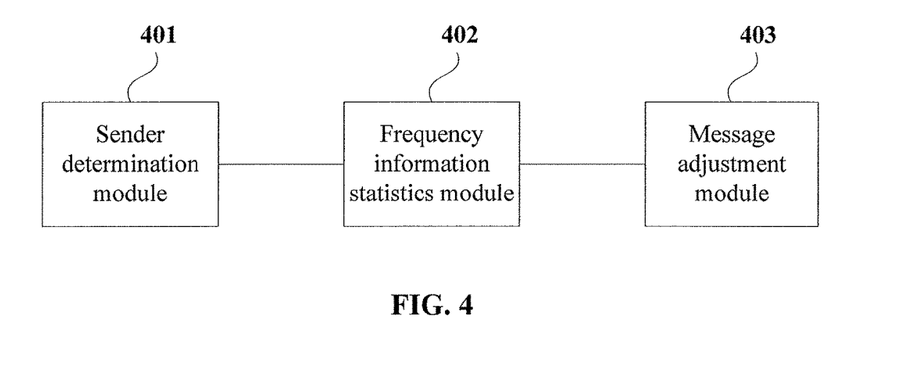
FIG. 4 is a structure block diagram illustrating a device for adjusting a broadcast message queue according to some embodiments of the disclosure.

FIG. 4 is a structure block diagram illustrating a device for adjusting a broadcast message queue according to an embodiment of the disclosure. The device may be implemented by software and/or hardware, and may be integrated in a terminal. The broadcast messages in the terminal may be controlled by executing a method for adjusting a broadcast message queue. As illustrated in FIG. 4, the device includes a sender determination module 401, a frequency information statistics module 402 and a message adjustment module 403.

The sender determination module 401 is configured to determine a target broadcast sender according to a broadcast message in a broadcast message queue.

The frequency information statistics module 402 is configured to make statistics on frequency information of identical broadcast messages sent by the target broadcast sender.

The message adjustment module 403 is configured to delete, when the frequency information of the identical broadcast messages exceeds a predetermined threshold, at least part of the identical broadcast messages in the broadcast message queue so as to adjust the broadcast message queue.

The device for adjusting a broadcast message queue provided in the embodiment of the disclosure makes statistics on frequency information of identical broadcast messages sent by the same broadcast sender, judges whether the broadcast messages are sent too frequently, and deletes at least part of the identical broadcast messages so as to adjust the broadcast message queue. In this way, a broadcast congestion and a system blocking caused by high-frequency sending of a broadcast message can be avoid effectively, and influence on system performances caused by broadcasts can be reduced.

In some embodiments, the message adjustment module 403 may be configured to retain a predetermined number of broadcast messages, that enter the queue late in a queuing order, of the identical broadcast messages in the broadcast message queue. And the message adjustment module 403 may be configured to remove broadcast messages ahead of the predetermined number of broadcast messages.

In some embodiments, the predetermined number may be determined according to the length of the broadcast message queue.

Figure 5:
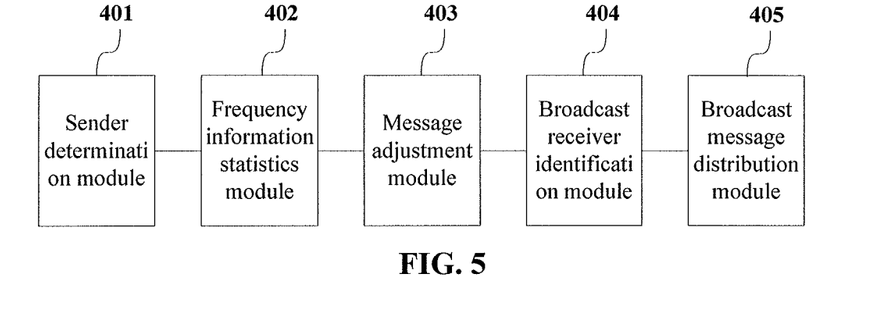
FIG. 5 is a structure block diagram illustrating a device for adjusting a broadcast message queue according to another embodiment of the disclosure.

FIG. 5 is a structure block diagram illustrating a device for adjusting a broadcast message queue according to another embodiment of the disclosure. As illustrated in FIG. 5, in some embodiments, the device for adjusting a broadcast message queue may further include a broadcast receiver identification module 404 and a broadcast message distribution module 405, in addition to the sender determination module 401, frequency information statistics module 402 and message adjustment module 403.

The broadcast receiver identification module 404 may be configured to identify, after the identical broadcast messages in the broadcast message queue have been adjusted, a broadcast receiver of a current broadcast message according to a queuing order of the broadcast messages in the adjusted broadcast message queue.

The broadcast message distribution module 405 may be configured to distribute the current broadcast message to the broadcast receiver.

In some embodiments, the frequency information may be frequency information within a predetermined time period before the current time.

Figure 6:
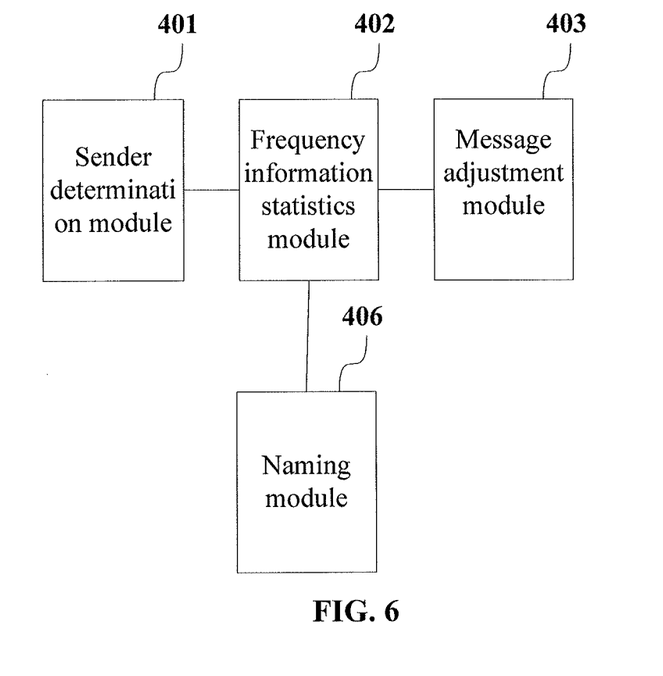
FIG. 6 is a structure block diagram illustrating a device for adjusting a broadcast message queue according to yet another embodiment of the disclosure.

FIG. 6 is a structure block diagram illustrating a device for adjusting a broadcast message queue according to yet another embodiment of the disclosure. As illustrated in FIG. 6, in some embodiments, the device for adjusting a broadcast message queue may further include a naming module 406, in addition to the sender determination module 401, frequency information statistics module 402 and message adjustment module 403.

The naming module 406 may be configured to, when establishing each of the plurality of broadcast messages, name the broadcast message. In such a case, the frequency information statistics module 402 may be configured to judge whether the broadcast messages are identical broadcast messages, according to names of broadcast messages sent by the target broadcast sender, i.e., the name of the broadcast message given by the naming module 406.

Here, it will easily appreciated that new embodiments may be provided by combining the embodiments illustrated in FIGS. 5 and 6. For example, the device for adjusting the broadcast message queue may include all of the sender determination module 401, frequency information statistics module 402, message adjustment module 403, broadcast receiver identification module 404, a broadcast message distribution module 405 and naming module 406.

The device for adjusting a broadcast message queue may execute the method for adjusting a broadcast message queue provided in any embodiment of the disclosure, and has corresponding functional modules for executing the method for adjusting a broadcast message queue as well as beneficial effects. For technical details not elaborated in the present embodiment, reference may be made to the method provided in any embodiment of the disclosure.

Figure 7:
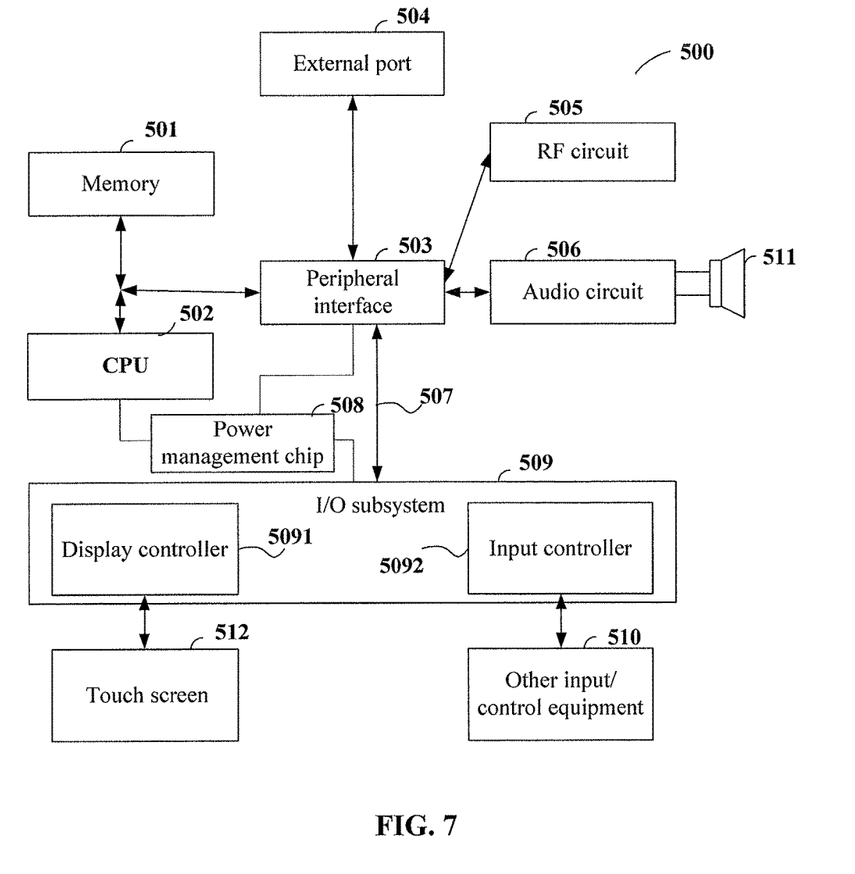
FIG. 7 is a structure diagram illustrating a terminal according to some embodiments of the disclosure.

An embodiment of the disclosures also provides a terminal. The terminal may include a device for adjusting a broadcast message queue provided in any embodiment of the disclosure. FIG. 7 is a structure diagram illustrating a terminal according to embodiments of the disclosure. As illustrated in FIG. 7, the terminal may include: a housing (not illustrated in the figure), a memory 501, a Central Processing Unit (CPU) 502 (also referred to as a processor, and referred to as CPU for short hereinafter), a computer program that is stored on the memory 501 and can run on the processor 502, a circuit board (not illustrated in the figure) and a power circuit (not illustrated in the figure). The circuit board is disposed inside a space encircled by the housing; and the CPU 502 and the memory 501 are disposed on the circuit board. The power circuit is used for supplying power to various circuits or devices of the terminal. The memory 501 is used for storing the computer program that can run on the processor. The CPU 502 reads and executes the computer program stored in the memory 501.

The terminal further includes: a peripheral interface 503, a Radio Frequency (RF) circuit 505, an audio circuit 506, a loudspeaker 511, a power management chip 508, an Input/Output (I/O) subsystem 509, a touch screen 512, other input/control equipment 510 and an external port 504. These components perform communication through one or more communication buses or signal lines 507.

It will be appreciated that the terminal 500 illustrated in the figure is only an example of a terminal, and the terminal 500 may have components more or less than those illustrated in the figure, two or more components may be combined, or the terminal 500 may have different component configurations. Various components illustrated in the figure may be implemented in hardware, software, or a combination of hardware and software. The hardware may include one or more signal processing and/or dedicated integrated circuits.

A terminal for adjusting a broadcast message queue provided in the present embodiment will be described in detail below. A mobile phone is taken as an example of the terminal.

The memory 501 may be accessed by the CPU 502, the peripheral interface 503 and the like. The memory 501 may include a high-speed random access memory. Or the memory 501 may include a nonvolatile memory such as one or more disk storage devices, flash devices or other volatile solid storage devices.

The peripheral interface 503 may connect input and output peripherals of equipment to the CPU 502 and the memory 501.

The I/O subsystem 509 may connect the input and output peripherals such as the touch screen 512 and other input/control equipment 510 on the equipment to the peripheral interface 503. The I/O subsystem 509 may include a display controller 5091 and one or more input controllers 5092 for controlling the other input/control equipment 510. The one or more input controllers 5092 receive an electric signal from the other input/control equipment 510 or send an electric signal to the other input/control equipment 510. Said other input/control equipment 510 may include a physical button (e.g., press button, rocker button, etc.), a dial, a sliding switch, an operating rod and a clicking roller. It is to be noted that the input controller 5092 may be connected to any one of a keyboard, an infrared port, a Universal Serial Bus (USB) interface and a pointing device such as a mouse.

The touch screen 512 is an input/output interface between a user terminal and a user, and displays a visual output to the user. The visual output may include a graph, a text, an icon, a video and the like.

The display controller 5091 in the I/O subsystem 509 receives an electric signal from the touch screen 512 or sends an electric signal to the touch screen 512. The touch screen 512 detects a contact on the touch screen. The display controller 5091 converts the detected contact into an interaction with a user interface object displayed on the touch screen 512 to realize a human-computer interaction. The user interface object displayed on the touch screen 512 may be an icon of game running, an icon of connection to a corresponding network, or the like. It is to be noted that the equipment may further include an optical mouse. The optical mouse may be a touch-sensitive surface that does not display the visual output or an extension of a touch-sensitive surface formed by the touch screen.

The RF circuit 505 is mainly used for establishing communications between a mobile phone and a wireless network (i.e., network side) to realize data receiving and sending between the mobile phone and the wireless network such as receiving and sending of a short message, an E-mail and the like. Specifically, the RF circuit 505 receives and sends an RF signal. The RF signal is also referred to as an electromagnetic signal. The RF circuit 505 converts an electric signal into an electromagnetic signal or converts an electromagnetic signal into an electric signal, and communicates with a communication network and other equipment through the electromagnetic signal. The RF circuit 505 may include known circuits for executing these functions, which includes, but is not limited to, an antenna system, an RF transceiver, one or more amplifiers, a tuner, one or more oscillators, a digital signal processor, a Coder-Decoder (CODEC) chip group, a Subscriber Identity Module (SIM) and the like.

The audio circuit 506 is mainly used for receiving audio data from the peripheral interface 503, converting the audio data into an electric signal, and sending the electric signal to the loudspeaker 511.

The loudspeaker 511 is used for restoring a voice signal that is received, by the mobile phone, from the wireless network through the RF circuit 505 into a sound, and playing the sound for the user.

The power management chip 508 is used for performing power supply and power management on the CPU 502, the I/O subsystem and hardwares connected to the peripheral interface.

When the CPU 502 provided in the embodiments of the disclosure executes the computer program stored in the memory 501, the following operations may be implemented: determining a target broadcast sender of each of a plurality of broadcast messages in a broadcast message queue; making statistics on frequency information of identical broadcast messages sent by the target broadcast sender; and when the frequency information of the identical broadcast messages exceeds a predetermined threshold, deleting at least part of the identical broadcast messages in the broadcast message queue so as to adjust the broadcast message queue.

The above-mentioned terminal can execute the method provided in any of the embodiments of the disclosure, and has corresponding functional modules for executing the method as well as beneficial effects.

It is to be noted that the above is only the preferable embodiments and the adopted technical principle of the disclosure. A person skilled in the art will understand that the disclosure is not limited to the specific embodiments herein. As will occur to a person skilled in the art, various apparent changes, re-adjustments and replacements can be made without departing from the scope of protection of the disclosure. Therefore, although the disclosure is described in detail through the above embodiments, the disclosure is not limited to the above embodiments. More other equivalent embodiments may also be included without departing from the concept of the disclosure, and the scope of the disclosure is defined by the scope of the appended claims.

The invention claimed is:

1. A method for adjusting a broadcast message queue carried out in a terminal, comprising:
   determining a target broadcast sender of each of a plurality of broadcast messages in a broadcast message queue, the plurality of broadcast messages being arranged in the broadcast message queue according to broadcast timings of the respective broadcast messages;
   making statistics on frequency information of identical broadcast messages sent by the target broadcast sender; and
   when the frequency information of the identical broadcast messages exceeds a predetermined threshold, deleting at least part of the identical broadcast messages in the broadcast message queue so as to adjust the broadcast message queue.

2. The method according to claim 1, wherein deleting at least part of the identical broadcast messages in the broadcast message queue so as to adjust the broadcast message queue comprises:
   retaining a predetermined number of broadcast messages, that enter the queue late in a queuing order, of the identical broadcast messages in the broadcast message queue, and removing broadcast messages ahead of the predetermined number of broadcast messages.

3. The method according to claim 2, wherein the predetermined number is determined according to the length of the broadcast message queue.

4. The method according to claim 1, wherein after deleting at least part of the identical broadcast messages in the broadcast message queue so as to adjust the broadcast message queue, the method further comprises:
   identifying a broadcast receiver of each broadcast message according to a queuing order of the broadcast messages in the adjusted broadcast message queue, and distributing the broadcast message to the broadcast receiver.

5. The method according to claim 1, wherein the frequency information is frequency information within a predetermined time period before the current time.

6. The method according to claim 1, wherein determining a target broadcast sender of each of a plurality of broadcast messages in a broadcast message queue comprises: determining, according to an identifier or configuration parameter of each broadcast message, a target broadcast sender of the broadcast message.

7. The method according to claim 1, wherein the predetermined threshold is determined according to a response speed of the terminal.

8. The method according to claim 1, further comprising:
   when establishing each of the plurality of broadcast messages, naming the broadcast message,
   wherein making statistics on frequency information of identical broadcast messages sent by the target broadcast sender comprises: judging, according to names of broadcast messages sent by the target broadcast sender, whether the broadcast messages are identical broadcast messages.

9. A terminal, comprising a memory, a processor and a computer program that is stored on the memory and can run on the processor, wherein the computer program, when executed by the processor, cause the processor to execute operations comprising:
   determining a target broadcast sender of each of a plurality of broadcast messages in a broadcast message queue, the plurality of broadcast messages being arranged in the broadcast message queue according to broadcast timings of the respective broadcast messages;
   making statistics on frequency information of identical broadcast messages sent by the target broadcast sender; and
   when the frequency information of the identical broadcast messages exceeds a predetermined threshold, deleting at least part of the identical broadcast messages in the broadcast message queue so as to adjust the broadcast message queue.

10. The terminal according to claim 9, wherein deleting at least part of the identical broadcast messages in the broadcast message queue so as to adjust the broadcast message queue comprises:
    retaining a predetermined number of broadcast messages, that enter the queue late in a queuing order, of the identical broadcast messages in the broadcast message queue, and removing broadcast messages ahead of the predetermined number of broadcast messages.

11. The terminal according to claim 10, wherein the processor is further configured to execute the computer program so as to determine the predetermined number according to the length of the broadcast message queue.

12. The terminal according to claim 9, wherein the processor is further configured to execute the computer program so as to identify, after deleting at least part of the identical broadcast messages in the broadcast message queue so as to adjust the broadcast message queue, a broadcast receiver of each broadcast message according to a queuing order of the broadcast messages in the adjusted broadcast message queue, and to distribute the broadcast message to the broadcast receiver.

13. The terminal according to claim 9, wherein the frequency information is frequency information within a predetermined time period before the current time.

14. The terminal according to claim 9, wherein determining a target broadcast sender of each of a plurality of broadcast messages in a broadcast message queue comprises: determining, according to an identifier or configuration parameter of each broadcast message, a target broadcast sender of the broadcast message.

15. The terminal according to claim 9, wherein the processor is further configured to execute the computer program so as to determine the predetermined threshold according to a response speed of the terminal.

16. The terminal according to claim 9, wherein the processor is further configured to: name, when establishing each of the plurality of broadcast messages, the broadcast message,
  wherein making statistics on frequency information of identical broadcast messages sent by the target broadcast sender comprises: judging, according to names of broadcast messages sent by the target broadcast sender, whether the broadcast messages are identical broadcast messages.

17. A non-transitory computer-readable storage medium having stored thereon instructions that, when executed by a processor, cause the processor to execute a method for adjusting a broadcast message queue, the method comprising:
  determining a target broadcast sender of each of a plurality of broadcast messages in a broadcast message queue, the plurality of broadcast messages being arranged in the broadcast message queue according to broadcast timings of the respective broadcast messages;
  making statistics on frequency information of identical broadcast messages sent by the target broadcast sender; and
  when the frequency information of the identical broadcast messages exceeds a predetermined threshold, deleting at least part of the identical broadcast messages in the broadcast message queue so as to adjust the broadcast message queue.

18. The non-transitory computer-readable storage medium according to claim 17, wherein deleting at least part of the identical broadcast messages in the broadcast message queue so as to adjust the broadcast message queue comprises:
  retaining a predetermined number of broadcast messages, that enter the queue late in a queuing order, of the identical broadcast messages in the broadcast message queue, and removing broadcast messages ahead of the predetermined number of broadcast messages.

19. The non-transitory computer-readable storage medium according to claim 18, wherein the predetermined number is determined according to the length of the broadcast message queue.

20. The non-transitory computer-readable storage medium according to claim 17, wherein after deleting at least part of the identical broadcast messages in the broadcast message queue so as to adjust the broadcast message queue, the method further comprises:
  identifying a broadcast receiver of each broadcast message according to a queuing order of the broadcast messages in the adjusted broadcast message queue, and distributing the broadcast message to the broadcast receiver.

* * * * *